Sept. 19, 1939.   M. H. SEYBERT   2,173,733
STERILIZER FOR SURGICAL DRESSINGS
Original Filed April 17, 1933
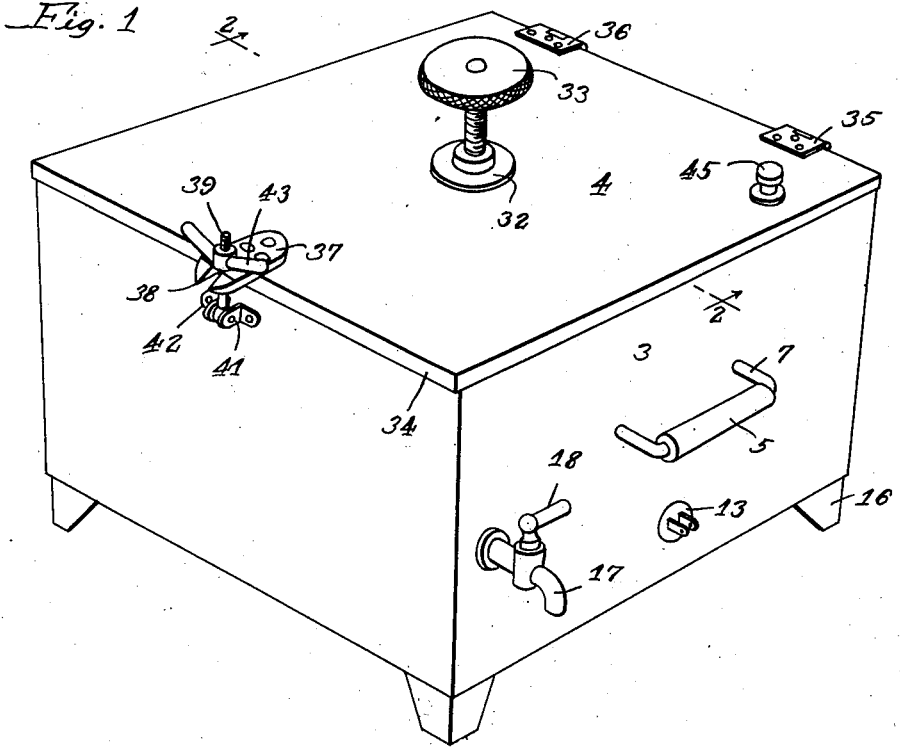
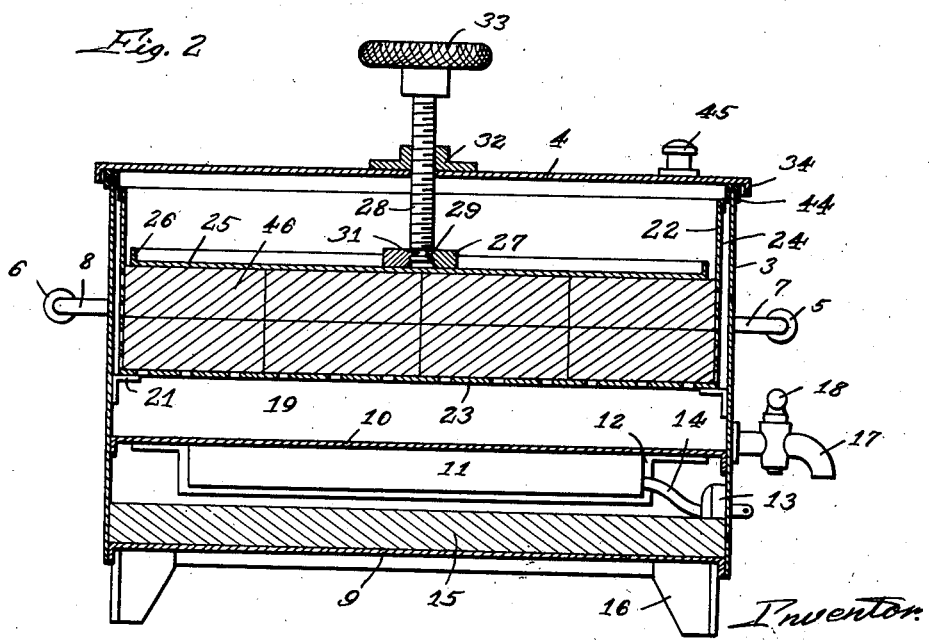
Inventor:
Mildred H. Seybert
By Wilson, Dowell, McCanna & Wintercorn Patented Sept. 19, 1939

2,173,733

UNITED STATES PATENT OFFICE 2,173,733

STERILIZER FOR SURGICAL DRESSINGS

Mildred H. Seybert, Rochester, Minn.

Application April 17, 1933, Serial No. 666,548
Renewed October 15, 1937

1 Claim. (Cl. 21—81)

The present invention deals with a sterilizer for surgical dressings and has particular reference to a construction for accomplishing such sterilization with economy and safety.

An object of the invention is to provide a container in which surgical dressings may be boiled to sterilize the same, having means for maintaining the dressings in their proper folded form during the boiling thereof, and means for removing the excess of water from the dressings before the removal thereof from the container so that they may be applied directly upon removal.

Another object of the invention is to provide a self-contained unit for boiling surgical dressings and expressing the excess water therefrom, which may be conveniently transported directly to the bedside of the patient.

A further object of the invention is to provide combined means for holding the dressings during the boiling thereof and for expressing the excess water therefrom upon the completion of sterilization.

A further object of the invention is to provide a generally improved means for handling surgical dressings, whereby the danger of contamination of the dressings prior to the application thereof is materially reduced as well as the time consumed in the operation.

Other objects and attendant advantages will become apparent to those skilled in the art from the following description and the accompanying drawing, in which—

Figure 1 is a perspective view of an embodiment of my invention, and

Fig. 2 is a section through the sterilizer taken on the line 2—2 of Figure 1.

The device consists of a container designated generally by the numeral 3 arranged to hold a quantity of water and having a cover 4 across its open top. For the sake of convenience, this may advantageously be a cabinet-like structure and will most economically be rectangular in shape. Preferably, the cabinet is made of sheet metal which may either be of a stainless composition or may be plated in the usual manner. Handles 5 and 6 of insulating material are placed at opposite ends of the cabinet and are supported on handle straps 7 and 8 secured to the container 3. These handles serve in transporting the cabinet from place to place during its use. The container 3 is provided with a bottom 9 and a false bottom 10, a space being provided therebetween for a heating element. In this instance, the heating element consists of an electrical unit 11 supported against the lower surface of the false bottom 10 by means of straps 12. The heating unit 11 is connected to an electrical fixture 13 by means of conductors 14, the fixture being secured in one of the side walls of the container 3 and being adapted to be connected to a commercial source of power in a conventional manner. A layer of insulating material 15 is placed on the upper surface of the bottom 9 so as to prevent heat from the heating element 11 from being radiated through the bottom of the cabinet so as to damage the table top upon which the cabinet is placed. Legs 16 serve to support the cabinet in spaced relation to the table top upon which it is placed to lend greater convenience in handling the device and to further prevent damage to the table from the heat generated in the cabinet. It will be understood that the electrical heating unit 11 may, if desired, be replaced by a gas or other heating device. A pet cock 17 is positioned in one wall of the container 3 above the false bottom 10 and is provided with a handle 18 which may be rotated so as to open the pet cock and drain liquid from the interior of the water chamber 19 above the false bottom 10.

Spaced brackets 21 are placed on the inner surface of the container 3 within the chamber 19 for the purpose of supporting a tray 22 of a size to be received in the chamber 19. The tray consists of a perforated bottom 23 and perforated side walls 24, the perforated bottom resting upon the brackets 21 to support the tray in spaced relation to the false bottom 10. A presser plate 25 preferably of sheet metal and of a size and shape to be received within the side walls 24 of the tray 22 is positioned in the tray and may be provided with upturned edges 26 for the purpose of stiffening the same. A block 27 is affixed to the upper surface of the presser plate substantially at its center and serves to receive the lower end of a screw 28 which is rotatably held therein by means of a shoulder 29 carried on a trunnion 31.

The screw 28 has threaded engagement with a boss 32 affixed to the top 4 of the cabinet, the screw passing through the boss and top, and carries a knurled knob 33 at its upper end for manual rotation of the screw. The top 4 preferably has downwardly turned edges 34 and is affixed to the container 3 by means of hinges 35 and 36 so that it may be swung between an open position and the closed position shown in the drawing. The side of the cover and container opposite the hinges 35 and 36 carries means for securing the top in its closed position. This may consist of an element 37 on the top extending over the edge and having a slot 38 for the reception of a bolt 39 pivotally carried on the side of the container in brackets 41 and 42 in a well known manner, the bolt 39 carrying a wing nut 43 which may be turned down against the top of the element 37 to secure the top firmly against the container. If desired, a U-shaped rubber gasket 44 may be positioned on the upper edge of the container, as shown in Fig. 2, to form a tight joint between the upper edge of the container and the top.

A vent 45 may advantageously be positioned in the top to permit the egress of steam or vapor when the contents of the container are heated or the ingress of air upon cooling of the contents.

In use, dressings such as shown at 46 are placed in the tray 22, as shown in Fig. 2. These dressings are standard in size and are either 2 by 4 by 4 or 2 by 4 by 8 inches. The tray 22 may conveniently be made of a size to accommodate a certain number of dressings of this size. The water chamber 19 is then filled with water to a point above the dressings and the top 4 of the container is let down, the latch mechanism being attached to hold the top firmly against the container. The knob 33 should be rotated so that the presser plate 25 will rest lightly on the top of the dressings without materially compressing the same and yet with sufficient force to prevent the agitation of the water during boiling from unfolding or disturbing the shape of the dressings. The fixture 13 is then connected to a suitable source of power and the water in the chamber 19 is heated to boiling and allowed to boil a sufficient time to bring about sterilization of the contents of this chamber, the steam thus generated escaping through the vent 45. When the dressings have been sterilized in this manner the flow of electricity is discontinued and the pet cock 17 is opened, thus draining the water out of the chamber 19. Thereafter, the knob 33 is rotated in a direction to force the presser plate 25 against the dressings, the presser plate being forced down until the desired amount of water has been expressed from the dressings. Upon release of the latch by rotation of the wing nut 43, the top may be raised, raising the presser plate with it and leaving the dressings exposed in the desired condition for application directly to the wound, so that they need only be removed and placed on the wound with a pair of forceps.

It will be seen that the entire operation of sterilizing and squeezing the dressings is carried out within the container and that when the top of the container is raised, it is only a matter of a moment's time before the dressings are placed in position on the wound. On the other hand, it has formerly been necessary to remove the dressing from the boiling water and wring it by grasping it at opposite ends with two pairs of forceps and twisting the dressing between its ends. This has occupied considerable time, has unduly exposed the dressings to the atmosphere and, in addition, causes the dressings to be twisted out of shape so that they do not lie properly in position upon the wound.

Another advantage lies in the fact that the water is expressed from all of the dressings at the same time and that the unused dressings are retained in the cabinet and are kept warm by merely closing the top. This permits the hospital attendant to proceed rapidly from patient to patient, the only operation being required at each bedside being the lifting of the cover for the removal of a dressing. In other words, the dressings may be completely prepared enmass and merely removed from the cabinet as used, thus materially speeding up the operations of applying the dressings. Furthermore, the dressings are, at all times, stored in a substantially sterile atmosphere.

Another advantage of the construction is the ease with which the cabinet may be transported from one bedside to another, the device being a unitary mechanism for carrying out all of the required operations and being contained in a single cabinet.

Another advantage of the invention lies in the fact that the dressings are firmly held during the boiling operation so that the turbulence of the boiling water does not cause the dressings to be unfolded or distorted in shape. As a result of this and the fact that the excess water is expressed from the dressings while held in the tray, the dressings are always in the best shape for immediate application to the wound.

My invention contemplates the use of any suitable means for heating the water for the sterilization process.

While I have thus described and illustrated a specific embodiment of my invention, I am aware that numerous alterations and changes may be made therein without materially departing from the spirit of the invention and the scope of the appended claim.

I claim:

A sterilizer for surgical dressings comprising a container adapted to contain water having a drain control at the bottom and means for preventing excess of steam pressure therein, a cover for said container, a flat open top perforate tray suitably supported in the container with the bottom of the tray above the bottom of the container and adapted to support surgical dressings, a flat presser plate covering the surgical dressings within the tray and means operable for positioning the presser plate so that it rests lightly on the top of dressings without materially compressing the same and yet with sufficient force to prevent the agitation of the water during boiling from unfolding or disturbing the shape of the dressings, and further operable after said sterilization operation to force the presser plate down upon the dressings until the desired amount of water has been expressed therefrom, said presser plate being carried by said container cover so that the cover and presser plate may be removed as a unit from the container to expose the dressings.

MILDRED H. SEYBERT.